United States Patent [19]

James et al.

[11] 4,283,315

[45] Aug. 11, 1981

[54] GRAMOPHONE RECORD COMPOSITION

[75] Inventors: Kenneth James, Reading; Frederick J. Smith, Prescot, both of England

[73] Assignee: Talres Development (N.A.) N.V., Netherlands Antilles

[21] Appl. No.: 91,802

[22] Filed: Nov. 6, 1979

[30] Foreign Application Priority Data

Nov. 6, 1978 [GB] United Kingdom ............... 43305/78

[51] Int. Cl.³ .......................... C08K 5/09; C08K 5/10; C08L 27/06
[52] U.S. Cl. .............................. 260/23 XA; 252/182; 252/381; 252/383; 252/384; 252/385; 260/45.75 W; 260/45.85 E; 260/998.16; 260/DIG. 15
[58] Field of Search ..... 260/23 XA, 998.16, DIG. 15, 260/45.75 W, 45.85 E; 252/182, 381, 383, 384, 385

[56] References Cited

U.S. PATENT DOCUMENTS

| | | | |
|---|---|---|---|
| 2,514,424 | 7/1950 | Smith | 260/23 XA |
| 3,004,000 | 10/1961 | Kauder et al. | 260/45.75 W |
| 3,351,577 | 11/1967 | Krumm | 260/45.75 W |
| 3,362,923 | 1/1968 | Knuth | 260/45.75 W |
| 3,960,790 | 6/1976 | Khanna | 260/23 XA |
| 3,975,321 | 8/1976 | Heiberger | 260/23 XA |
| 4,032,702 | 6/1977 | James | 536/119 |
| 4,055,518 | 10/1977 | Kakitani et al. | 260/23 XA |
| 4,072,790 | 2/1978 | Creekmore et al. | 260/23 XA |

*Primary Examiner*—Ronald W. Griffin
*Attorney, Agent, or Firm*—Ostrolenk, Faber, Gerb & Soffen

[57] ABSTRACT

Gramophone records are prepared from a vinyl polymer composition containing a fatty acid soap of an alkaline earth metal or zinc, sugar or polyol fatty acid esters and fatty acid mixed glycerides and is free of heavy metal ions.

15 Claims, No Drawings

GRAMOPHONE RECORD COMPOSITION

This invention relates to a composition for use in the manufacture of gramophone records, and in particular to a composition with antistatic properties.

Gramophone records are conventionally produced from vinyl chloride/vinyl acetate copolymers compounded with various additives. Carbon black is generally added, particularly to provide a black opaque composition, although it also serves the purpose of distributing electrical charges and increasing the rate at which such charges are dissipated. The composition also includes a stabiliser for the resin. Stabilisers are conventionally solid organic compounds of heavy metals, the more common of which are toxic. Examples are lead, cadmium and barium salts. While it would be desirable to avoid the use of toxic materials if at all possible, in order to prevent industrial hazards, it has previously been found impossible. It appears that salts of lead, barium and cadmium, particularly with fatty acids, have the necessary degree of affinity with vinyl chloride polymers which other non-toxic materials do not. Thus, for example, even where a calcium salt is used in conventional resins it is always accompanied by a lead salt, or an expensive alternative such as a liquid organotin compound which must be carefully metered.

Other additives include plasticisers, lubricants and mould release agents.

Various substances have been proposed as antistatic additives for record compositions, to be added to the resin during the copolymerisation, during the isolation of the resin from the polymerisation medium and during subsequent compounding. Some antistatic agents, when added to the mixture during the compounding stage, tend to give rise to excessive concentrations on the record surfaces, thus causing a reduction in the surface quality of the record produced. Typical antistatic agents include quaternary ammonium compounds such as N,N-bis(2-hydroxyethyl)-N-(3'-dodecyloxy-2'-hydroxyethyl)-methylammonium methosulphate and long-chain primary aliphatic alcohol/ethylene oxide condensates, such as Ethylan (registered Trade Mark) D 259. Generally speaking, however, commercially produced records are not very antistatic, and consequently they tend to attract dust unless special steps are taken by the user to prevent static build-up or to disperse it. Static charges thus remain a serious problem in the record industry.

Higher quantities of carbon black cannot be incorporated into record compositions to give improved antistatic properties because small agglomerates of carbon black and polymer tend to occur, giving rise to surface noise on the record produced.

None of the presently used antistatic agents provides any other effect such as lubrication and stabilisation, and consequently a mixture of additives is required.

We have now found that vinyl copolymer compositions of the type used in the production of gramophone records can be rendered substantially antistatic and at the same time sufficiently stabilised and lubricated for intensive mixing, compounding and press moulding by incorporating therein a conveniently obtained mixture of a fatty acid soap of an alkaline earth metal or zinc; fatty acid esters of a sugar or other polyol; and mixed glycerides of fatty acids. Incorporation of a mixture of this type into the vinyl copolymer composition obviates the need for toxic stabilisers such as lead salts and at the same time obviates the need for additional antistatic agents which cause problems in record production. It also obviates the addition of a lubricant.

In general, the composition should contain from 0.3 to 1.5% of the fatty acid soap of an alkaline earth metal or zinc; 0.3 to 1.85% of sugar or polyol fatty acid esters and from 0.15 to 1.10% of mixed glycerides, all percentages being by weight. Preferably the sucrose ester to glyceride ratio should be at least 1.3:1 and preferably no more than 2.2:1 by weight. A ratio of about 2:1 is particularly good. We have found that too high a proportion of glycerides can cause the composition to be over lubricated and possibly also too brittle. Where other esters are present, e.g. lactitol laurate, the overall ratio of ester to glyceride may be higher, e.g. up to 5:1.

Greater than 1.5% by weight of the soap tends to cause surface noise problems on the records, and a content of no more than 1%, preferably about 0.6% is advantageous.

The soap is preferably a calcium soap, although magnesium and zinc soaps are also of interest. The soap may be of a single fatty acid having at least 8 carbon atoms, but will more conveniently be the soap of a mixture of such fatty acids obtained from a naturally occurring triglyceride by saponification, optionally preceded by hydrogenation.

The sugar or polyol esters are preferably esters of non-reducing disaccharides or alditol glycosides, e.g. sucrose or lactitol esters and should comprise predominantly (e.g. about 70%) mono- and di-esters of fatty acids, which again may be single acids or mixtures of acids obtained from naturally occurring triglycerides. A degree of substitution of from 1 to 3.5 is desirable. In either case, the fatty acid should have a carbon content of at least 8.

The fatty acids may with advantage be derived from at least partially unsaturated fat, i.e. may contain a proportion of acids having one or more olefinic double bonds. The degree of unsaturation of a fat is normally expressed by the iodine value, reflecting the degree of reaction with iodine monochloride. A fully saturated compound has an i.v. of substantially zero, while an unsaturated fat has an i.v. of 100 or more. Thus, for example, it is preferred to use the mixed acid ester derived from a naturally occurring fat such as tallow, or a fractionated portion thereof, which has not been hydrogenated. A fat with an i.v. of 20–60 is preferable, especially 40–50.

The mixed glycerides should comprise at least 70% by weight of mixed mono- and di-glycerides with a free fatty acid content of not more than 3% expressed as oleic acid. The total free and bound glycerol content should not exceed 33% by weight nor be less than 16% by weight. Again, partially unsaturated fatty acid glycerides are preferred over fully hydrogenated ones.

The three component mixture of soaps, sucrose esters and glycerides to be incorporated in the vinyl composition according to the present invention may be obtained from any convenient process and the different components may be added together from different sources. However, it is particularly convenient to obtain the mixture from the transesterification of sucrose, particularly in a solvent-free process such as that of our British Pat. No. 1,399,053 or U.S. Pat. No. 4,032,702. The crude material obtained from this process can be treated with an aqueous salt of the alkaline earth metal or zinc to obtain a solid cake generally comprising by weight from 30 to 50% of soaps, 20 to 35% sucrose esters and 15 to 25% mixed glycerides, together with a minor amount of free sugar and inorganic matter. This material can be used directly as the agent to be incorporated in the vinyl copolymer composition. Preferably, however, the sucrose ester and glyceride content is increased by addition of further purified material to give a composition in the range defined above in which the sucrose ester:glyceride ratio is as required. Even if extra sucrose ester and glyceride are added, it is most desirable that the alkaline earth metal or zinc soap is formed in situ in the glycerides and not prepared separately.

The soap, glyceride and sugar or polyol ester, especially with the soap formed in situ, are preferably milled and combined with an anticaking agent, such as a finely divided silica or aluminosilicate powder, to form a free-flowing powder additive for plastics compositions.

The vinyl base of the composition may be any conventional vinyl homopolymer-copolymer composition suitable for the purpose. The stabilising and antistatic agents of the present invention may be combined with the composition by conventional powder mixing intensive mixing or kneading using the normal equipment for this purpose.

Conventionally, the composition will contain carbon black, which may be added together with the stabilising and antistatic compounds or may be previously incorporated into the vinyl resin. One possible mode of addition is to combine the carbon black powder with the mixture of soaps, sugar esters, glycerides and anticaking agent, to produce a free-flowing particulate material for addition to the resin. A convenient ratio of carbon black to lubrication/antistatic agent according to the invention is from 1:5 to 2:1 by weight.

square would have longer sides which would be proportionally further away from each other thus giving the same resistance. Thus, no spatial dimensions need be stated. For example, a resistivity of about $10^{15} \Omega/\square$ can be reduced to a surface resistivity of $10^{12}$ to $10^{13} \Omega/\square$ by adding the three components as indicated above. At the same time, the three-component mixture can replace the normal toxic stabiliser and the lubricant, which would normally be added.

The following examples and comparative examples illustrate the invention.

The following table illustrates three examples of composition according to the present invention, three comparative examples using mixtures of additives outside the scope of the present invention, and two comparative examples showing standard commercial compositions.

The Examples 1 to 7 are all based on the vinyl chloride/vinyl acetate copolymer C4812 supplied by Lonza Limited of Basle, Switzerland. Example 7 uses the record composition HOO/90 formulated by Lonza Limited by incorporating conventional toxic stabiliser components containing barium and cadmium into copolymer C4812. Example 8 uses the record composition 'Gala' (Trade Mark) supplied by Zipperling Kessler and Company of Ahrensburg, West Germany for high quality record production. It is based on a vinyl chloride/vinyl acetate copolymer and is found to contain an organotin stabiliser. Examples 1 to 6 are examples of formulations according to the invention. In each case, the composition contained about 0.3% carbon black.

Examples 1 to 3 are particularly preferred compositions giving particularly good results; Examples 4 to 6 are less preferred since although they give good resistivity figures, the sound reproduction is poorer and would need to be corrected.

| Example No. | Additives | | | | Surface resistivity | Sound reproduction | Flexibility* of record |
|---|---|---|---|---|---|---|---|
| | Approx. percentage | | | Ester: Glyceride | | | |
| | Ca Soap | Ester | Glyceride | | | | |
| 1. | 0.6 | 1.13 | 0.545 | 2.07:1 | $1.0 \times 10^{13}$ | Good | F |
| 2. | 1.2 | 0.825 | 0.6 | 1.38:1 | $3.7 \times 10^{13}$ | Some surface noise | F |
| 3. | 0.6 | 1.4** | 0.3 | 4.7:1$^{(a)}$ | $4 \times 10^{13}$ | Good | F |
| 4. | 0.6 | 0.4 | 2.95 | 0.14:1 (too low) | $2.5 \times 10^{13}$ | Fair | B |
| 5. | 0.6 | 1.84 | 0.8 | 2.3:1 (too high) | $2.2 \times 10^{13}$ | Surface noise | F |
| 6. | 0.6 | 2.55 | 1.05 | 2.4:1 (too high) | $1.1 \times 10^{13}$ | Poor | B |
| 7. | Lonza record grade HOO/90 | | | | $1.9 \times 10^{15}$ | Good | F |
| 8. | Zipperling Kessler 'Gala' (Trade Mark) | | | | $4.0 \times 10^{15}$ | Good | F |

**1.4 = 0.4% sucrose esters
+1.0% lactitol laurate
*F - Flexible
B - Brittle
$^{(a)}$sucrose ester: glyceride ratio = 1.34:1

Incorporation of the three component composition according to the invention into the record composition enables a surface resistivity to be obtained which is three orders of magnitude less than that of a conventional commercial record composition containing no added antistatic agent. (The surface resistivity is defined (a Dictionary of Electronics, Penguin Books) as the resistance between two opposed sides of a unit square and is given the units $\Omega/\square$. It will be seen that a larger

We claim:

1. A stabilised gramophone record composition comprising a vinyl polymer containing by weight from 0.3 to 1.5% of a fatty acid soap of an alkaline earth metal or zinc;

0.3 to 1.85% of sugar or polyol fatty acid esters; and
0.15 to 1.10% of fatty acid mixed glycerides; and
being free of heavy metal ions.

2. A composition according to claim 1, in which the soap is derived from a mixture of fatty acids obtained from a naturally occurring triglyceride.

3. A composition according to claim 1, in which the fatty acid moiety of any of the ester, soap and glyceride components has an iodine value of 20–60.

4. A composition according to claim 3, in which the mixed glycerides comprise at least 70% by weight of mono- and di-glycerides with a free fatty acid content of not more than 3% expressed as oleic acid.

5. A composition according to claim 1, in which the vinyl polymer is a vinyl chloride-vinyl acetate copolymer.

6. A composition according to claim 1, in which the fatty acid esters include sucrose esters.

7. A composition according to claim 1 or claim 6, in which the soap content is from 0.3 to 1.0%.

8. A composition according to claim 6, in which the sucrose ester to glyceride ratio is from 1.3:1 to 2.2:1.

9. A composition according to claim 6, in which the soap, ester and glyceride mixture is at least in part obtained from a transesterification of sucrose.

10. A composition according to claim 9, in which the soap has been formed in situ in the glycerides.

11. A composition according to claim 6, also containing a lactitol ester.

12. An antistatic stabilising powder composition for incorporation into a gramophone record plastics composition, comprising 6 to 30 parts by weight of a fatty acid soap of an alkaline earth metal or zinc; 6 to 37 parts by weight of sugar or polyol fatty acid esters and 3 to 22 parts by weight of fatty acid mixed glycerides, together with an anti-caking agent.

13. A composition according to claim 12 further containing carbon black.

14. A composition according to claim 13, containing carbon black and the soap, ester and glyceride mixture in a ratio of from 1:5 to 2:1 by weight.

15. A gramophone record formed of a plastics composition containing by weight from 0.3 to 1.5% of a fatty acid soap of an alkaline earth metal or zinc; 0.3 to 1.85% of sugar or polyol fatty acid esters; and 0.15 to 1.10% of fatty acid mixed glycerides; and being free of heavy metal ions.

* * * * *